US012689701B2

(12) United States Patent
Koyama

(10) Patent No.: US 12,689,701 B2
(45) Date of Patent: Jul. 21, 2026

(54) INFORMATION PROCESSING APPARATUS, INFORMATION PROCESSING SYSTEM, AND NON-TRANSITORY COMPUTER READABLE MEDIUM FOR SPOT COLOR CONVERSION

(71) Applicant: FUJIFILM Business Innovation Corp., Tokyo (JP)

(72) Inventor: Yuichiro Koyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/183,296

(22) Filed: Mar. 14, 2023

(65) Prior Publication Data
US 2024/0089396 A1 Mar. 14, 2024

(30) Foreign Application Priority Data
Sep. 13, 2022 (JP) ................................. 2022-145203

(51) Int. Cl.
*H04N 1/54* (2006.01)
(52) U.S. Cl.
CPC ..................................... *H04N 1/54* (2013.01)
(58) Field of Classification Search
CPC ........... H04N 1/54; H04N 1/56; H04N 1/6008

USPC .............. 358/1.9, 1.18, 515, 537, 538, 540; 345/624, 629; 715/243, 249, 275, 276, 715/766
See application file for complete search history.

(56) References Cited

U.S. PATENT DOCUMENTS

2015/0262047 A1* 9/2015 Tsuwano ............... G06F 3/1275
358/1.9

FOREIGN PATENT DOCUMENTS

| JP | H06209416 A | * | 7/1994 |
| JP | 2012-058977 A | | 3/2012 |
| JP | 2012-226549 A | | 11/2012 |
| JP | 2016103695 A | * | 6/2016 |

OTHER PUBLICATIONS

May 12, 2026 Office Action issued in Japanese Patent Application No. 2022-145203.

* cited by examiner

*Primary Examiner* — Jamares Q Washington
(74) *Attorney, Agent, or Firm* — Oliff PLC

(57) ABSTRACT
An information processing apparatus includes a processor configured to: detect a first object and a second object from application data, a layer order of objects being specified in the application data, each of the first and second objects being presented in a predetermined display mode; and convert an object in a layer positioned between a layer of the first object and a layer of the second object into a spot color.

12 Claims, 10 Drawing Sheets

FIG. 7

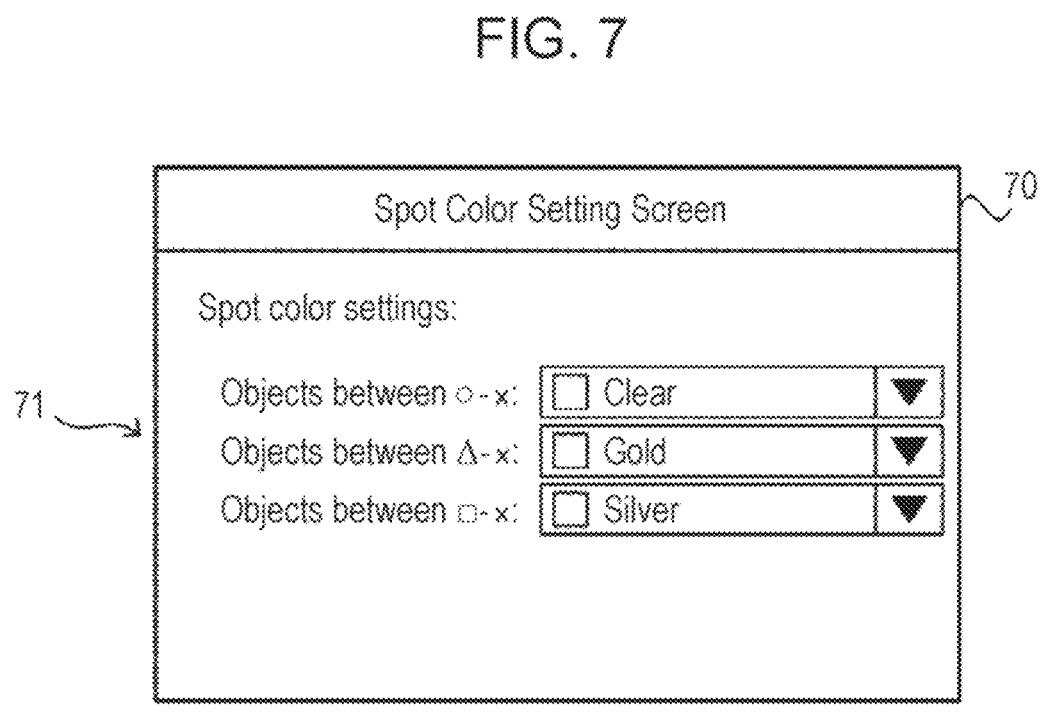

Spot Color Setting Screen — 70

Spot color settings:

71

Objects between ○ - ×: ☐ Clear ▼

Objects between △ - ×: ☐ Gold ▼

Objects between ☐ - ×: ☐ Silver ▼

INFORMATION PROCESSING APPARATUS, INFORMATION PROCESSING SYSTEM, AND NON-TRANSITORY COMPUTER READABLE MEDIUM FOR SPOT COLOR CONVERSION

CROSS-REFERENCE TO RELATED APPLICATIONS

This application is based on and claims priority under 35 USC 119 from Japanese Patent Application No. 2022-145203 filed Sep. 13, 2022.

BACKGROUND

(i) Technical Field

The present disclosure relates to an information processing apparatus, an information processing system, and a non-transitory computer readable medium.

(ii) Related Art

Japanese Unexamined Patent Application Publication No. 2012-58977 discloses a print control device that creates page description language (PDL) data for printing document data by using a spot-color recording agent. The print control device includes a determiner, an obtainer, a remover, and an issuer. The determiner determines whether a specific object expressed by a specified color which is used for specifying a region to be printed with a spot-color recording agent is included in document data. The obtainer obtains the specified color expressing the specific object which is determined to be included in the document data by the determiner. The remover removes the specific object from the document data. The issuer issues a drawing command for printing, among objects indicated by the print data except for the specific object removed by the remover, an object expressed by the same color as the obtained specified color by using the spot-color recording agent.

SUMMARY

Typically, when spot color printing is performed by using an application that does not support spot color printing, settings for spot color printing are set on a driver setting screen. Using the driver setting screen, however, a user is required to perform a complicated operation, such as setting the color and the position of an object in detail. This is burdensome for the user.

Aspects of non-limiting embodiments of the present disclosure relate to providing an information processing apparatus, an information processing system, and a non-transitory computer readable medium that can reduce a load of a user setting spot color printing settings, compared with the configuration in which a user sets spot color printing settings on a driver setting screen.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: detect a first object and a second object from application data, a layer order of objects being specified in the application data, each of the first and second objects being presented in a predetermined display mode; and convert an object in a layer positioned between a layer of the first object and a layer of the second object into a spot color.

BRIEF DESCRIPTION OF THE DRAWINGS

Exemplary embodiments of the present disclosure will be described in detail based on the following figures, wherein:

FIG. 7 is a front view illustrating an example of a spot color setting screen according to the first exemplary embodiment;

DETAILED DESCRIPTION

Figure 1:
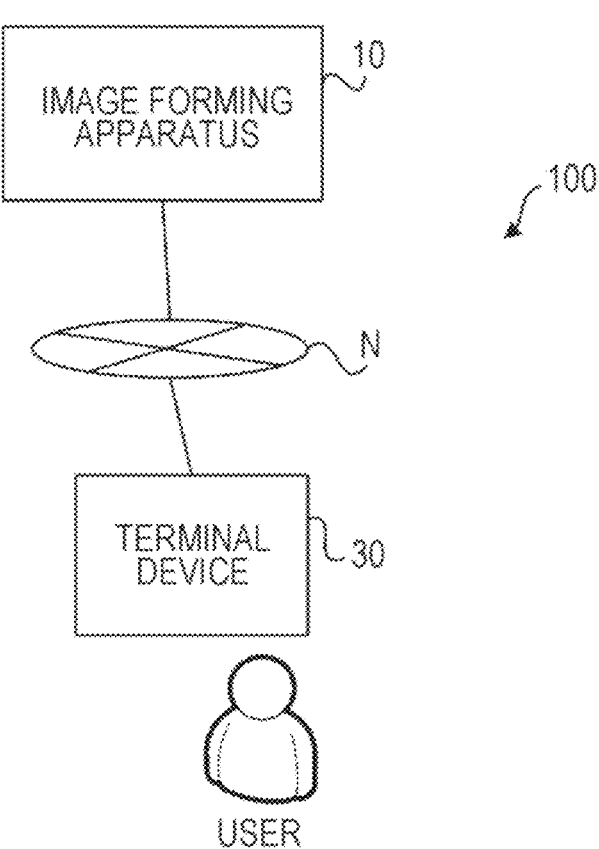
FIG. 1 is a schematic diagram illustrating an example of the configuration of an information processing system according to a first exemplary embodiment.

Exemplary embodiments to carry out the disclosure will be described below in detail with reference to the accompanying drawings. In the drawings, elements functioning and operated in the same manner are designated by like reference numeral and operations functioning and executed in the same manner are also designated by like reference numeral, and an explanation thereof may not be repeated. The drawings are only schematically illustrated to such a degree as to sufficiently understand the disclosure and are not for limiting the disclosure. In the exemplary embodiments, an explanation of the configurations of elements that are not directly related to the disclosure and those of elements that are already known may be omitted.

First Exemplary Embodiment

FIG. 1 is a schematic diagram illustrating an example of the configuration of an information processing system 100 according to a first exemplary embodiment.

As illustrated in FIG. 1, the information processing system 100 includes an image forming apparatus 10 and a terminal device 30. Although only one terminal device 30 is shown in the example in FIG. 1, plural terminal devices 30 may be included in the information processing system 100.

The image forming apparatus 10 according to the first exemplary embodiment is an example of an information processing apparatus.

The image forming apparatus 10 executes image-related functions in response to a user instruction. The image forming apparatus 10 is connected to the terminal device 30, which is used by a user, via a network N. Examples of the network N are the internet, a local area network (LAN), and a wide area network (WAN). The connection mode of the network N is not limited to a specific mode. The network N may connect the image forming apparatus 10 and the terminal device 30 via a wired medium, a wireless medium, or a mixture of wired and wireless mediums.

In one example, the image forming apparatus 10 has a scan function of reading an image formed on a recording medium, such as a sheet, as image data, a print function of forming an image indicated by image data on a recording medium, and a copy function of forming the same image as that formed on a recording medium on another recording medium. The copy function, print function, and scan function are examples of image processing performed by the image forming apparatus 10.

Various devices, such as a personal computer (PC), a smartphone, and a tablet terminal, used by a user may be used as the terminal device 30.

A user causes the image forming apparatus 10 to execute desired image processing by sending image data generated in the terminal device 30 to the image forming apparatus 10 via the network N. To cause the image forming apparatus 10 to execute desired image processing, the user may alternatively store image data in a portable storage medium, such as a universal seral bus (USB) memory or a memory card, and connect the portable storage medium to the image forming apparatus 10. Alternatively, the user may bring a document on which at least one of text and an image is formed to the image forming apparatus 10 and cause the image forming apparatus 10 to read the document.

Figure 2:
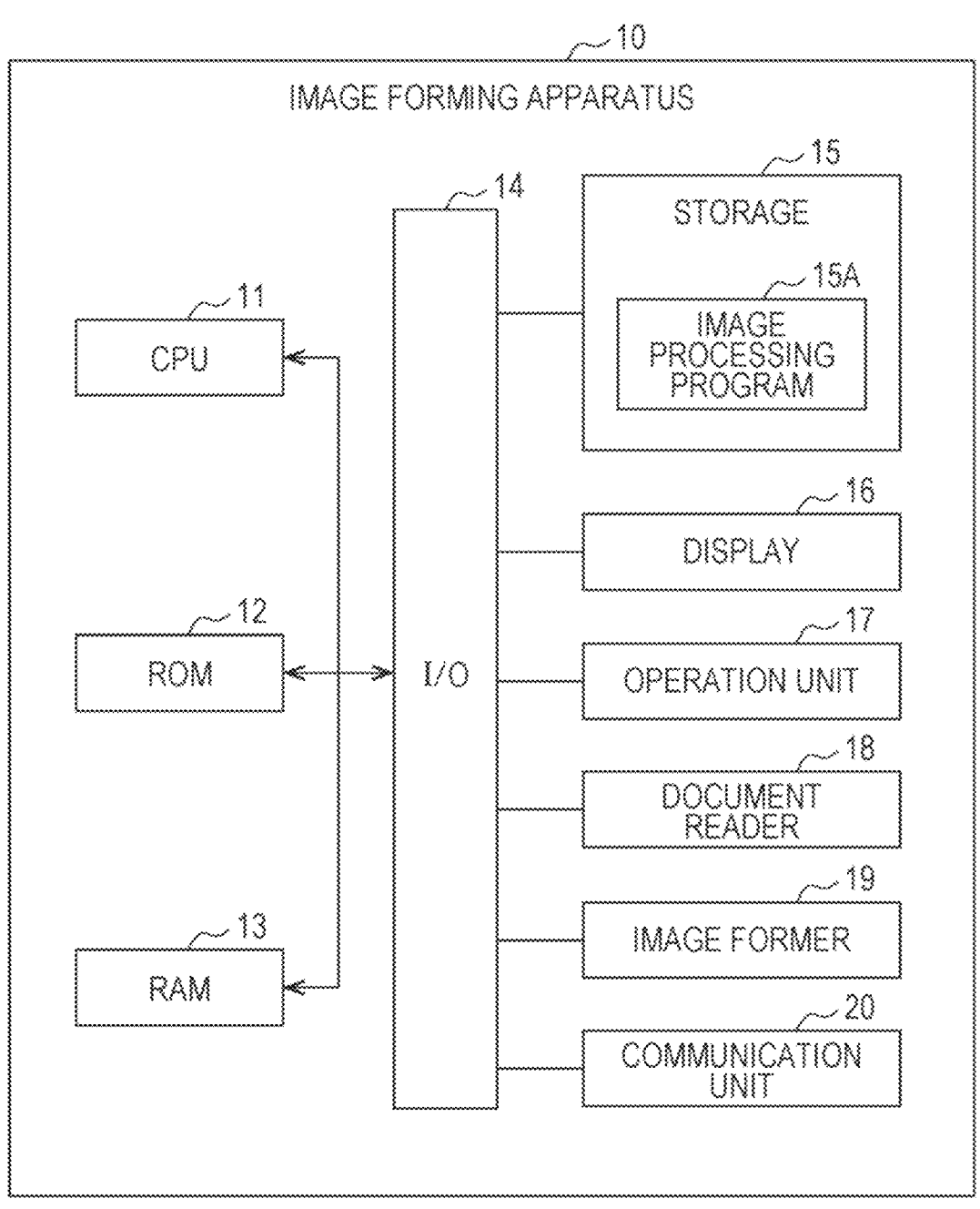
FIG. 2 is a block diagram illustrating an example of the electrical configuration of an image forming apparatus according to the first exemplary embodiment.

FIG. 2 is a block diagram illustrating an example of the electrical configuration of the image forming apparatus 10 according to the first exemplary embodiment.

As illustrated in FIG. 2, the image forming apparatus 10 includes a central processing unit (CPU) 11, a read only memory (ROM) 12, a random access memory (RAM) 13, an input/output interface (I/O) 14, a storage 15, a display 16, an operation unit 17, a document reader 18, an image former 19, and a communication unit 20.

The CPU 11, ROM 12, RAM 13, and I/O 14 are connected to each other via a bus. Functional elements including the storage 15, display 16, operation unit 17, document reader 18, image former 19, and communication unit 20 are connected to the I/O 14. These functional elements and the CPU 11 can communicate with each other via the I/O 14.

The CPU 11, ROM 12, RAM 13, and I/O 14 form a controller. The controller may be formed as a sub-controller that controls part of the operation of the image forming apparatus 10 or as part of a main controller that controls the entirety of the operation of the image forming apparatus 10. An integrated circuit (IC), such as a large scale integration (LSI) circuit, or an IC chipset may be used for some or all of the blocks forming the controller. In this case, each block may be formed by an individual circuit, or some or all of the blocks may be integrated into a single circuit. The blocks may be integrated with each other, or some blocks may be formed separately from the other blocks. In each block, part of a block may be formed separately from the other parts of the block. Instead of using an IC, such as an LSI circuit, a dedicated circuit or a general-purpose processor may be used for integrating the blocks of the controller.

As the storage 15, a hard disk drive (HDD), a solid state drive (SSD), or a flash memory may be used. In the storage 15, an image processing program 15A according to the first exemplary embodiment is stored. The image processing program 15A may alternatively be stored in the ROM 12. The image processing program 15A is an example of an information processing program.

The image processing program 15A may be preinstalled in the image forming apparatus 10. The image processing program 15A may be stored in a non-volatile storage medium or be distributed via the network N and then be installed in the image forming apparatus 10. Examples of the non-volatile storage medium are a compact disc-read only memory (CD-ROM), a magneto-optical disk, an HDD, a digital versatile disc-read only memory (DVD-ROM), a flash memory, and a memory card.

As the display 16, a liquid crystal display (LCD) or an organic electroluminescence (EL) display may be used. The display 16 may form a touchscreen. The operation unit 17 includes a set of operation keys, such as a numeric keypad and a start key. The display 16 and the operation unit 17 serve as an operation panel to receive various instructions regarding image processing functions and settings from a user to use the image forming apparatus 10. Various instructions from a user include an instruction to start reading a document, an instruction to start copying a document, and an instruction to print print data stored in the image forming apparatus 10. The display 16 displays results of processing executed in response to an instruction from a user and various items of information, such as notification about processing.

The document reader 18 receives documents one by one placed on a feeder stand of an automatic document feeder (not shown) provided on the upper part of the image forming apparatus 10 and optically reads the documents, thereby obtaining image data. Alternatively, the document reader 18 optically reads a document placed on a document table, such as platen glass, thereby obtaining image data.

The image former 19 forms, on a sheet, which is an example of a recording medium, an image based on image data obtained by the document reader 18 reading a document or an image based on image data obtained from a print instruction provided by the terminal device 30. Hereinafter, a description will be given, assuming that an image is formed according to an electrophotographic system. However, another method, such as an inkjet method, may be used.

If the electrophotographic system is employed, the image former 19 includes a photoconductor drum, a charger, an exposure device, a developing device, a transfer device, and a fixing device. The charger applies a voltage to the photoconductor drum to charge the surface of the photoconductor drum. The exposure device exposes the photoconductor drum charged by the charger to light corresponding to image data, thereby forming an electrostatic latent image on the photoconductor drum. The developing device develops the electrostatic latent image formed on the photoconductor drum with a toner, thereby forming a toner image on the photoconductor drum. The transfer device transfers the toner image formed on the photoconductor drum to a sheet. The fixing device fixes the toner image transferred to the sheet on the sheet with heat and pressure.

The communication unit 20 is a communication interface for connecting the image forming apparatus 10 to the network N, such as the internet, a LAN, or a WAN, so that the image forming apparatus 10 can communicate with the terminal device 30 via the network N.

The image forming apparatus 10 according to the first exemplary embodiment supports spot color printing. That is, the image forming apparatus 10 is able to perform spot color printing using spot colors, such as transparent colors (clear), metallic colors, and fluorescent colors, as well as standard color printing using process colors, such as cyan (C), magenta (M), yellow (Y), and black (K). The configuration for performing spot color printing is not restricted to a specific configuration, and the electrophotographic system or the inkjet method, may be used.

Figure 3:
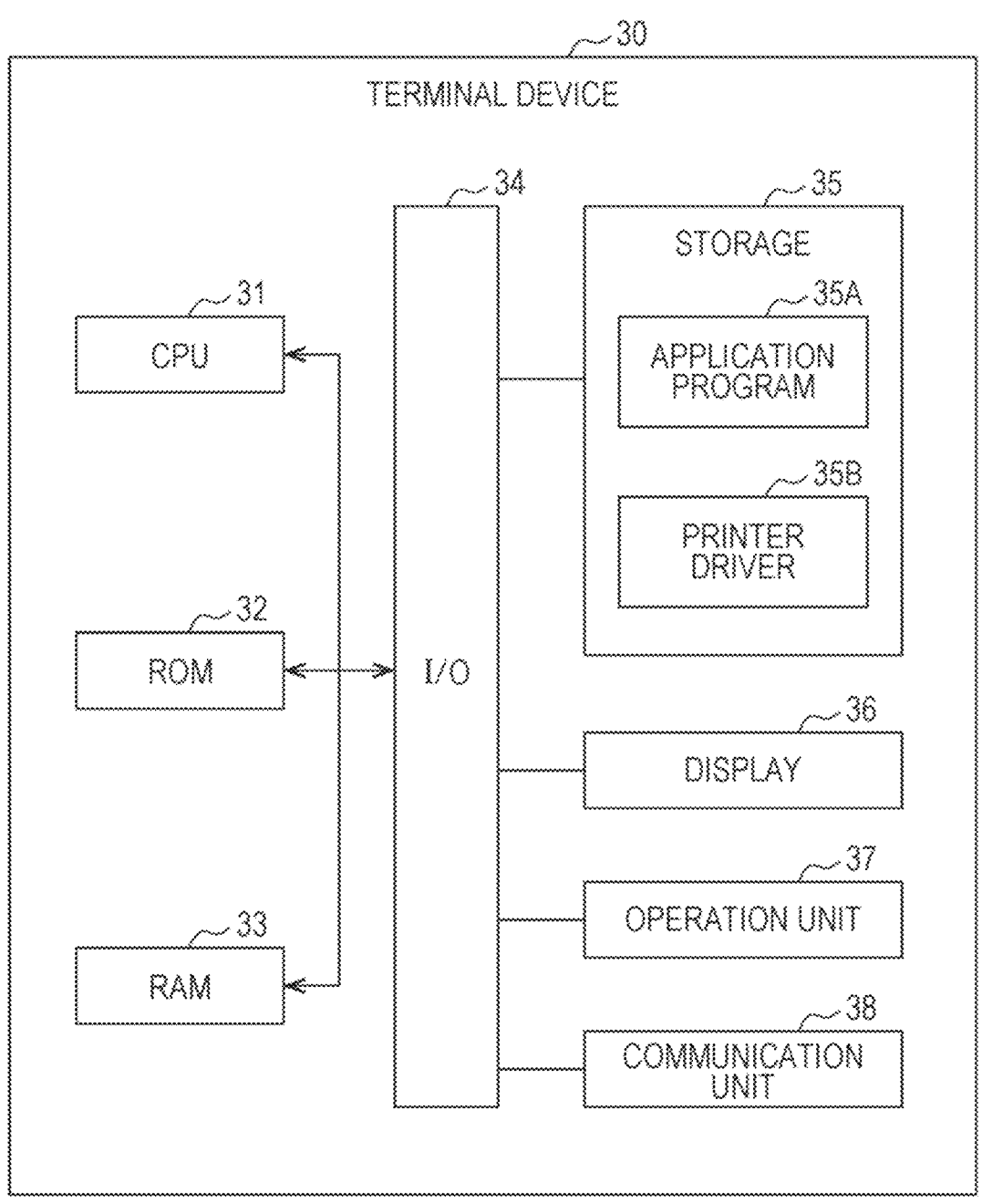
FIG. 3 is a block diagram illustrating an example of the electrical configuration of a terminal device according to the first exemplary embodiment.

FIG. 3 is a block diagram illustrating an example of the electrical configuration of the terminal device 30 according to the first exemplary embodiment.

As illustrated in FIG. 3, the terminal device 30 includes a CPU 31, a ROM 32, a RAM 33, an I/O 34, a storage 35, a display 36, an operation unit 37, and a communication unit 38.

The CPU 31, ROM 32, RAM 33, and I/O 34 are connected to each other via a bus. Functional elements including the storage 35, display 36, operation unit 37, and communication unit 38 are connected to the I/O 34. These functional elements and the CPU 31 can communicate with each other via the I/O 34.

The CPU 31, ROM 32, RAM 33, and I/O 34 form a controller. The controller may be formed as a sub-controller that controls part of the operation of the terminal device 30 or as part of a main controller that controls the entirety of the operation of the terminal device 30.

As the storage 35, an HDD, an SSD, or a flash memory may be used. In the storage 35, an application program 35A and a printer driver 35B according to the first exemplary embodiment are stored. The application program 35A is an application which does not support spot color printing and which can specify the layer order of objects. For example, the application program 35A may be various applications, such as presentation applications, spreadsheet applications, and document creating applications. The printer driver 35B is a program for converting image data created using the application program 35A into print data that can be printed with the image forming apparatus 10. The application program 35A and the printer driver 35B may be stored in the ROM 32.

The application program 35A and the printer driver 35B may be preinstalled in the terminal device 30. Each of the application program 35A and the printer driver 35B may be stored in a non-volatile storage medium or be distributed via the network N and then be installed in the terminal device 30. Examples of the non-volatile storage medium are a CD-ROM, a magneto-optical disk, an HDD, a DVD-ROM, a flash memory, and a memory card.

As the display 36, an LCD or an organic EL display may be used. The display 36 may form a touchscreen. The operation unit 37 includes input devices, such as a keyboard and a mouse. The display 36 and the operation unit 37 receive various instructions from a user of the terminal device 30. The display 36 displays results of processing executed in response to an instruction from a user and various items of information, such as notification about processing.

The communication unit 38 is connected to the network N, such as the internet, a LAN, or a WAN, so that the terminal device 30 can communicate with the image forming apparatus 10 via the network N.

When spot color printing is performed with an application that does not support spot color printing, settings for spot color printing are typically set by using a driver setting screen.

Figures 4A, 4B:
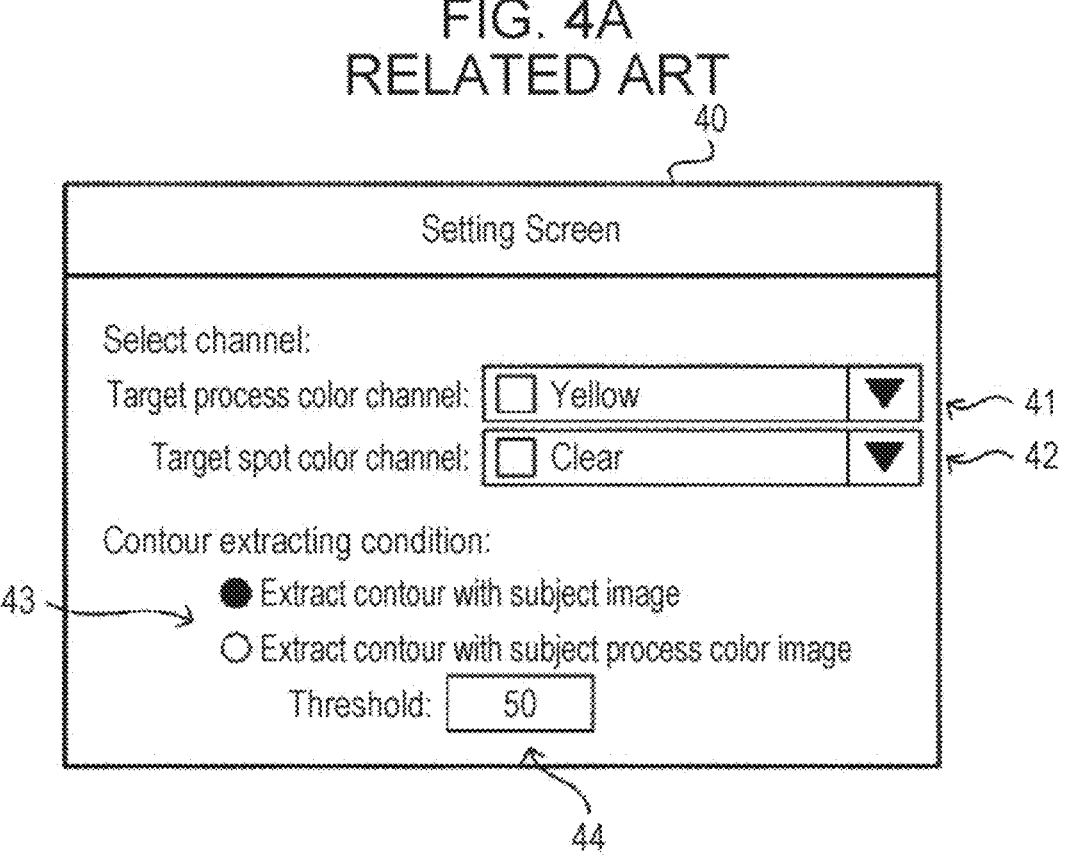
FIGS. 4A and 4B respectively illustrate a driver setting screen and a subject image according to a comparative example.

FIGS. 4A and 4B respectively illustrate a driver setting screen 40 and a subject image 50 according to a comparative example.

The driver setting screen 40 shown in FIG. 4A includes a target process color channel selector 41, a target spot color channel selector 42, a contour extracting condition selector 43, and a density threshold inputter 44.

In the target process color channel selector 41, a desired color can be selected from plural process colors. For example, Y is selected from four C, M, Y, K colors. In the target spot color channel selector 42, a desired color can be selected from one or more spot color toners (inks) loaded in a printer. For example, a transparent color (clear) is selected. In the contour extracting condition selector 43, a condition to be applied to contour extracting processing is selected. For example, one of "extract contour with a subject image" and "extract contour with a subject process color image" is selected. "Extract contour with a subject image" refers to that the contour of a target object is extracted based on a subject image as a reference image. "Extract contour with a subject process color image" refers to that the contour of a target object is extracted based on a subject process color image (spot color image) as a reference image. In the density threshold inputter 44, a desired value can be input as the density threshold, which is used as a reference for extracting the contour of a target object.

The subject image 50 shown in FIG. 4B is an example of a subject image when "extract contour with a subject image" is selected as the contour extracting condition on the driver setting screen 40 in FIG. 4A. A processing range 55 is set in the subject image 50. The processing range 55 is set as a result of a user specifying a desired range in the subject image 50 with a pointing device, such as a mouse. The subject image 50 includes objects 51 through 54. It is assumed that the objects 51, 52, and 54 each include the target process color, which is Y, while the object 53 does not include Y. The processing range 55 includes the entirety of the object 51, the entirety of the object 52, part of the object 53, and part of the object 54.

In the comparative example shown in FIGS. 4A and 4B, the contours of the objects 51 and 52 are extracted based on the density values of the subject image 50. More specifically, the density value of a subject pixel, which is to be determined whether this pixel is part of the contour of the object 51 or 52, is compared with that of an adjacent pixel adjacent to the subject pixel. If the difference between the density value of the subject pixel and that of the adjacent pixel is greater than or equal to the density threshold, the subject pixel is determined to be a pixel forming the contour of the object 51 or 52.

In this manner, to set spot color printing settings on the driver setting screen 40, the user is required to perform a complicated operation, such as setting the color and the position of an object in detail. This is burdensome for the user and the user is likely to make a mistake. This is conspicuous particularly when the user is required to handle plural spot colors in one document or one print job.

To address this issue, the image forming apparatus 10 according to the first exemplary embodiment detects a first object and a second object, each of which is presented in a predetermined display mode, from application data in which the layer order of objects is specified and converts an object in a layer interposed between the layer of the first object and the layer of the second object to a spot color.

Figure 5:
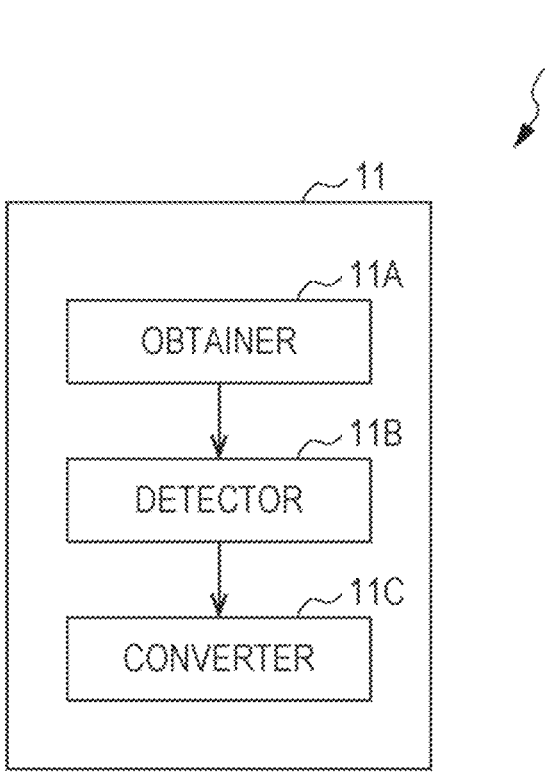
FIG. 5 is a block diagram illustrating an example of the functional configuration of the image forming apparatus according to the first exemplary embodiment.

More specifically, the CPU 11 of the image forming apparatus 10 loads the image processing program 15A stored in the storage 15 to the RAM 13 and executes it, thereby functioning as the elements shown in FIG. 5. The CPU 11 is an example of a processor.

FIG. 5 is a block diagram illustrating an example of the functional configuration of the image forming apparatus 10 according to the first exemplary embodiment.

As illustrated in FIG. 5, the CPU 11 of the image forming apparatus 10 functions as an obtainer 11A, a detector 11B, and a converter 11C.

The obtainer 11A obtains application data from the terminal device 30. The application data in the first exemplary embodiment is print data generated as a result of the printer driver 35B of the terminal device 30 converting image data created by the application program 35A stored in the terminal device 30. In this application data, the layer order of objects is specified. This application data does not support spot colors.

The detector 11B detects a first object and a second object, each of which is presented in a predetermined display mode, from the application data obtained by the obtainer 11A. To detect the first and second objects, a known method, such as pattern matching, may be used. The first object is a start edge indicating the start of a spot color converting range, while the second object is an end edge indicating the end of the spot color converting range. The display mode of the first object is different from that of the second object. The type of spot color is associated with the display mode of the first object. For example, the type of spot color, such as clear, gold, or silver, is associated with the display mode of the first object as spot color setting information.

The converter 11C converts an object in a layer interposed between the layer of the first object and the layer of the second object into a spot color. Hereinafter, the object in the layer positioned between the layer of the first object and the layer of the second object will be called a spot-color-conversion target object.

The function of the converter 11C will be described below more specifically. The converter 11C first interprets the spot color setting information associated with the display mode of the first object. The converter 11C then interprets the layer order of objects and detects a spot-color-conversion target object in a layer interposed between the layer of the first object and the layer of the second object. The converter 11C then excludes both of the first and second objects from objects to be subjected to spot color printing. At this time, the converter 11C may set the first object in the bottommost layer of the above-described layer order and then exclude the objects in the layers higher than the layer of the second object. Then, the converter 11C converts the spot-color-conversion target object into a spot color, based on the type of spot color obtained by interpreting the spot color setting information.

Application data used for spot color conversion processing according to the first exemplary embodiment will be specifically explained below with reference to FIGS. 6A, 6B, and 7.

Figure 6A:
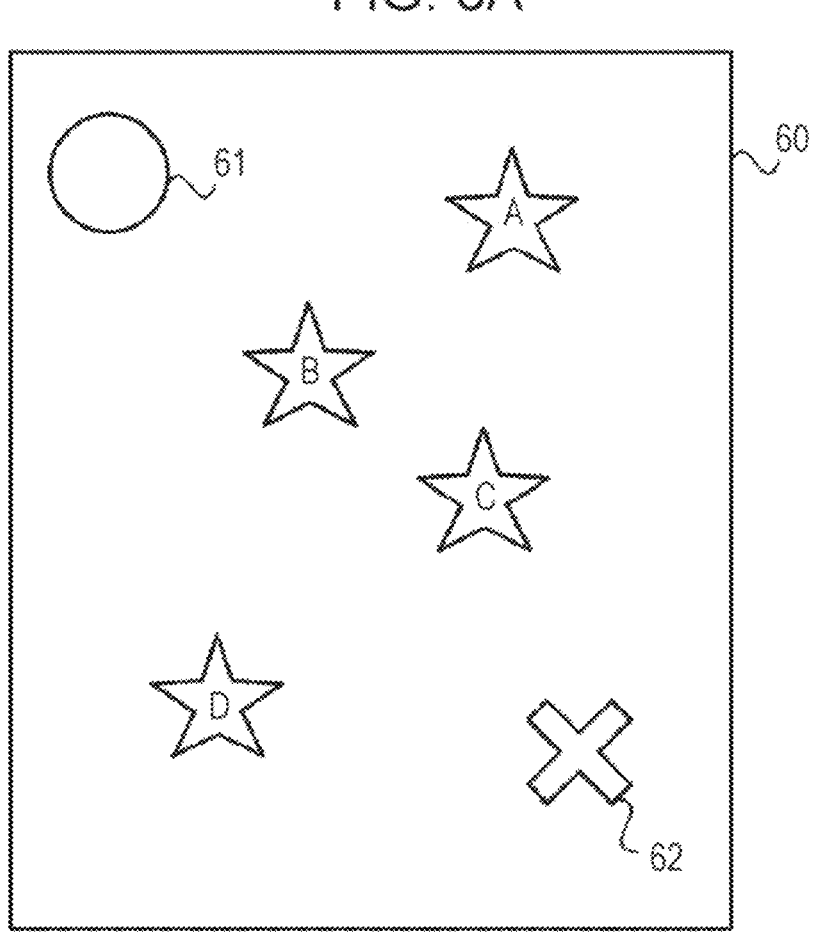
FIGS. 6A and 6B schematically illustrate an example of application data in which the layer order is specified.
Figure 6B:
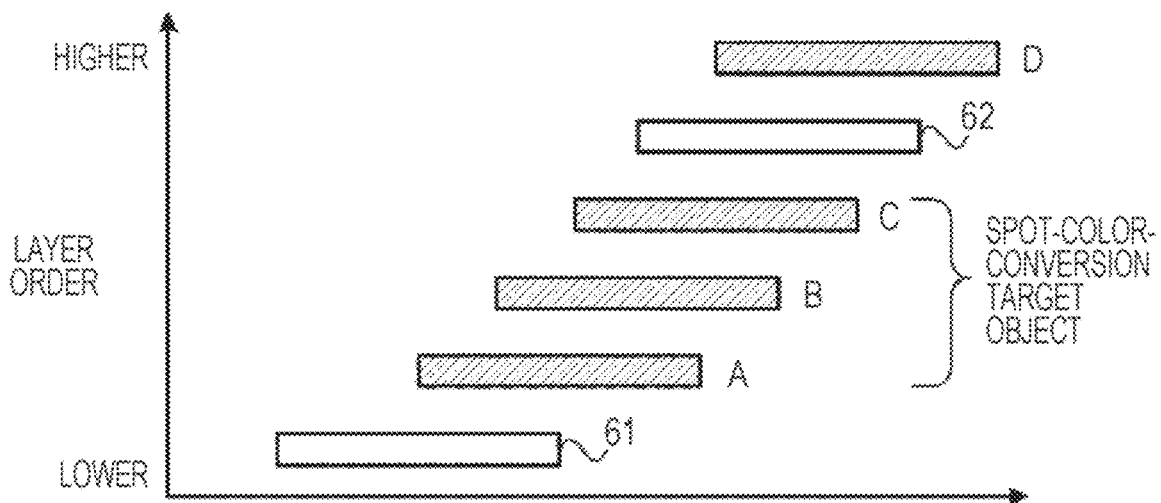

FIGS. 6A and 6B schematically illustrate application data 60, which is an example of application data in which the layer order of objects is specified. The application data 60 does not support spot colors and is created by the application program 35A which can specify the layer order of objects.

In the application data 60 shown in FIG. 6A, the layer order shown in FIG. 6B is specified. In this layer order, a first object 61, object A, object B, object C, second object 62, and object D are arranged from the lower layer to the higher layer.

In the example in FIGS. 6A and 6B, object A, object B, and object C are positioned between the first object 61 and the second object 62 and are thus spot-color-conversion target objects. Object D is positioned in a layer higher than the layer of the second object 62 and is not set as a spot-color-conversion target object. The positions of the first object 61 and the second object 62 are not limited to particular positions and may be located at any position within a page of the application data 60.

The display mode of each of the first and second objects 61 and 62 is expressed by at least one of the shape, color, and text. The type of spot color is associated with at least one of the shape, color, and text of the first object 61. In the example in FIG. 6A, the first object 61 is represented as a circular (o) shape object, while the second object 62 is represented by a cross (x) shape object. As the type of spot color, for example, "clear" is associated with the circular shape object, "gold" is associated with a triangular (A) shape object, and "silver" is associated with a square (Q) shape object. In the example in FIG. 6A, since the first object is a circular shape object, object A, object B, and object C are converted into "clear".

The circular shape and size of the first object 61 and the cross shape and size of the second object 62 may not necessarily be judged precisely, and a certain allowance range may be given. For example, a shape similar to the circular shape (elliptical shape, for example) and a shape similar to the cross shape (asterisk (*) shape, for example) may be regarded as a circle and a cross, respectively. If the size of the circular shape and that of the cross shape are each within a predetermined range, they may be regarded as a circle and a cross, respectively.

The first object 61 and the second object 62 may be distinguished from each other by the color, instead of the shape. For instance, the first object 61 may be expressed by a red circular shape, while the second object 62 may be expressed by a blue circular shape. The first object 61 and the second object 62 may be distinguished from each other by text, instead of the shape. For instance, the first object 61 may be represented by a character string "start edge", while the second object 62 may be represented by a character string "end edge". The first object 61 and the second object 62 may be distinguished from each other by a combination of the shape, color, and text.

FIG. 7 is a front view illustrating an example of a spot color setting screen 70 according to the first exemplary embodiment. The spot color setting screen 70 shown in FIG. 7 is displayed on the terminal device 30 as one function of the application program 35A or the printer driver 35B. If the spot color setting screen 70 is one function of the application program 35A, information on spot colors that can be converted from objects is obtained from the printer driver 35B.

The spot color setting screen 70 shown in FIG. 7 includes a spot color setter 71. In the spot color setter 71, for each combination type of the first object 61 and the second object 62, a desired color can be selected from one or more spot color toners (inks) loaded in the image forming apparatus 10. In the example in FIG. 7, "clear" is set for objects between a circular shape object and a cross shape object (objects between o-x), "gold" is set for objects between a triangular shape object and a cross shape object (objects between A-x), and "silver" is set for objects between a square shape object and a cross shape object (objects between Q-x). Information which is set on the spot color setting screen 70 is associated with the display mode of the first object 61 as the spot color setting information. Since the first object 61 is a circular shape object in the example in FIGS. 6A and 6B, "clear" is set as the spot color setting information.

In the above-described example in FIGS. 6A and 6B, only one combination type of the first object 61 and the second object 62 is indicated in the application data 60. However, two or more combination types of the first object 61 and the second object 62 may be provided. For example, if object D indicated by the application data 60 is also to be converted into a spot color "gold", a triangular shape object and a cross shape object are arranged, separately from the circular shape object and the cross shape object, so as to sandwich the layer of the object D therebetween.

The operation of the image forming apparatus 10 according to the first exemplary embodiment will be described below with reference to FIG. 8.

Figure 8:
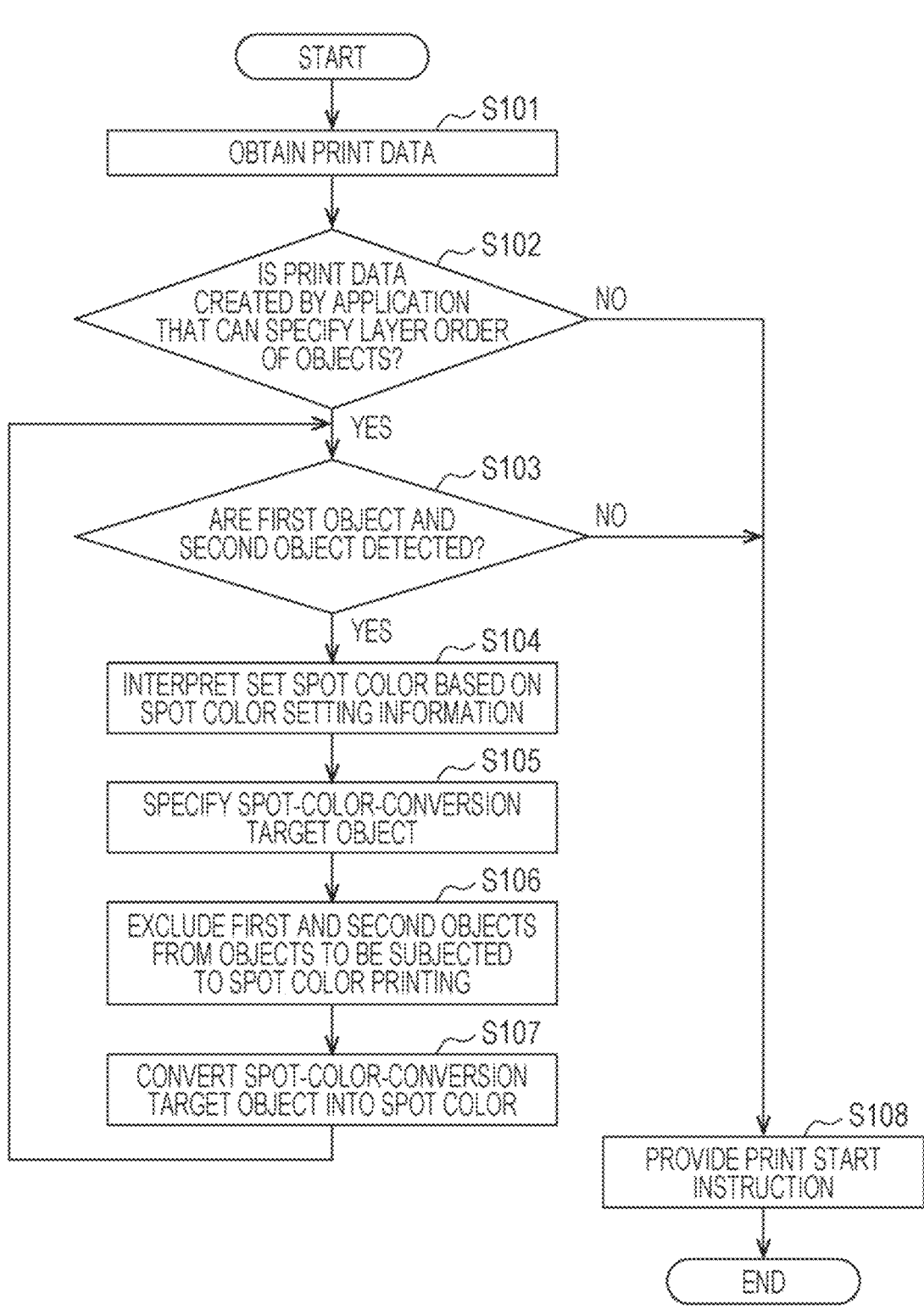
FIG. 8 is a flowchart illustrating an example of a procedure of processing executed by using an image processing program according to the first exemplary embodiment.

FIG. 8 is a flowchart illustrating an example of a procedure of processing executed by using the image processing program 15A according to the first exemplary embodiment.

The CPU 11 of the image forming apparatus 10 first starts the image processing program 15A and executes the following steps.

In step S101 in FIG. 8, the CPU 11 obtains print data indicating application data from the terminal device 30.

In step S102, the CPU 11 judges whether the print data obtained in step S101 is data created by an application that can specify the layer order of objects. If the print data is data created by an application that can specify the layer order of objects (YES in step S102), the CPU 11 proceeds to step S103. If the print data is not data created by an application that can specify the layer order of objects (NO in step S102), the CPU 11 proceeds to step S108.

In step S103, the CPU 11 judges whether a first object and a second object are detected from the print data. If the first and second objects are detected (YES in step S103), the CPU 11 proceeds to step S104. If the first and second objects are not detected (NO in step S103), the CPU 11 proceeds to step S108.

In step S104, the CPU 11 interprets a set spot color, based on spot color setting information associated with the display mode of the first object.

In step S105, the CPU 11 specifies a spot-color-conversion target object, based on the first and second objects.

In step S106, the CPU 11 excludes the first and second objects from objects to be subjected to spot color printing.

In step S107, the CPU 11 converts the spot-color-conversion target object specified in step S105 into a spot color, based on the set spot color interpreted in step S104. The CPU 11 then returns to step S103 and repeats processing.

In step S108, the CPU 11 instructs the image former 19 of the image forming apparatus 10 to start printing and then completes the processing using the image processing program 15A.

According to the first exemplary embodiment, the image forming apparatus 10 detects the first object and the second object from application data in which the layer order of objects is specified, and converts an object in a layer interposed between the layer of the first object and the layer of the second object into a spot color.

This saves a user setting complicated spot color printing settings using a driver setting screen, thereby reducing the load for the user, particularly when the user is required to handle plural spot colors in one document or one print job.

The user is thus less likely to make a mistake, compared with the configuration in which spot color printing settings are set on a driver setting screen.

Second Exemplary Embodiment

In the first exemplary embodiment, the image forming apparatus 10 executes spot color conversion processing. In a second exemplary embodiment, the terminal device 30 executes spot color conversion processing. This will be discussed below.

Figure 9:
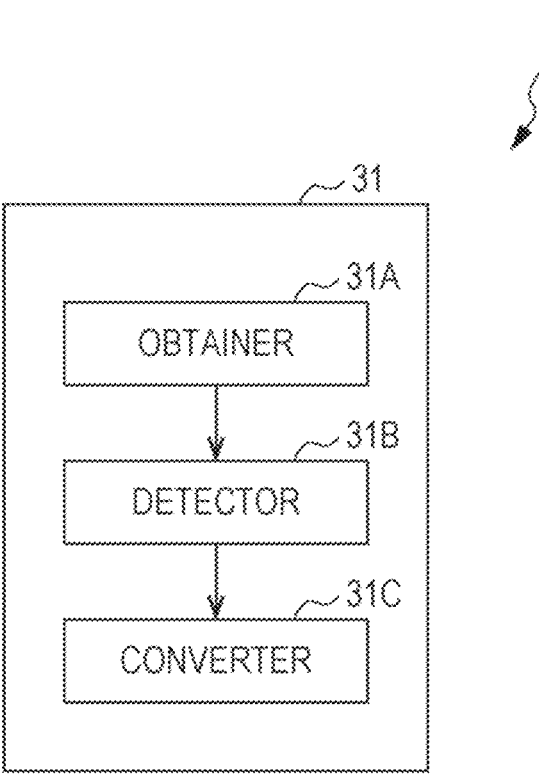
FIG. 9 is a block diagram illustrating an example of the functional configuration of the terminal device according to a second exemplary embodiment.

The CPU 31 of the terminal device 30 loads the printer driver 35B stored in the storage 35 to the RAM 33 and executes it, thereby functioning as the elements shown in FIG. 9. The CPU 31 is an example of the processor. The printer driver 35B is an example of the information processing program.

FIG. 9 is a block diagram illustrating an example of the functional configuration of the terminal device 30 according to the second exemplary embodiment.

As illustrated in FIG. 9, the CPU 31 of the terminal device 30 functions as an obtainer 31A, a detector 31B, and a converter 31C.

The obtainer 31A obtains image data created by the application program 35A stored in the terminal device 30. The obtainer 31A then converts the obtained image data to print data indicating application data. That is, the application data in the second exemplary embodiment is print data generated as a result of the printer driver 35B converting image data created by the application program 35A stored in the terminal device 30. In this application data, the layer order of objects is specified. This application data does not support spot colors.

The detector 31B detects a first object and a second object, each of which is presented in a predetermined display mode, from the application data converted from the image data obtained by the obtainer 31A.

The converter 31C converts a spot-color-conversion target object in a layer interposed between the layer of the first object and the layer of the second object into a spot color.

The operation of the terminal device 30 according to the second exemplary embodiment will be described below with reference to FIG. 10.

Figure 10:
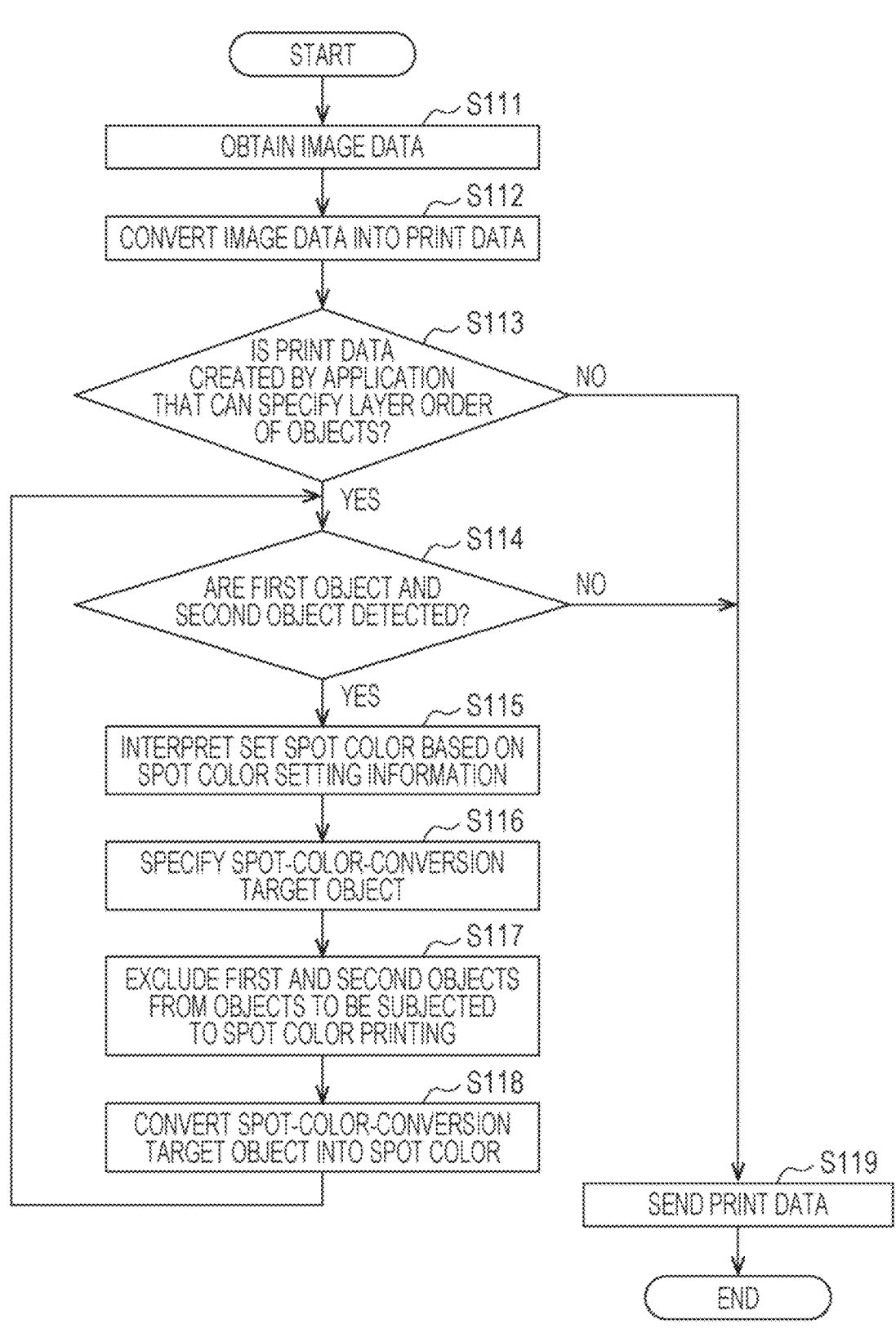
FIG. 10 is a flowchart illustrating an example of a procedure of processing executed by using a printer driver according to the second exemplary embodiment.

FIG. 10 is a flowchart illustrating an example of a procedure of processing executed by using the printer driver 35B according to the second exemplary embodiment.

The CPU 31 of the terminal device 30 first starts the printer driver 35B and executes the following steps.

In step S111 in FIG. 10, the CPU 31 obtains image data created by the application program 35A stored in the terminal device 30.

In step S112, the CPU 31 converts the image data obtained in step S111 into print data indicating application data.

In step S113, the CPU 31 judges whether the print data converted from the image data in step S112 is data created by an application that can specify the layer order of objects. If the print data is data created by an application that can specify the layer order of objects (YES in step S113), the CPU 31 proceeds to step S114. If the print data is not data created by an application that can specify the layer order of objects (NO in step S113), the CPU 31 proceeds to step S119.

In step S114, the CPU 31 judges whether a first object and a second object are detected from the print data. If the first and second objects are detected (YES in step S114), the CPU 31 proceeds to step S115. If the first and second objects are not detected (NO in step S114), the CPU 31 proceeds to step S119.

In step S115, the CPU 31 interprets a set spot color, based on spot color setting information associated with the display mode of the first object.

In step S116, the CPU 31 specifies a spot-color-conversion target object, based on the first and second objects.

In step S117, the CPU 31 excludes the first and second objects from objects to be subjected to spot color printing.

In step S118, the CPU 31 converts the spot-color-conversion target object specified in step S116 into a spot color, based on the set spot color interpreted in step S115. The CPU 31 then returns to step S114 and repeats processing.

In step S119, the CPU 31 sends the print data subjected to spot color conversion processing to the image forming apparats 10 and then completes the processing using the printer driver 35B.

According to the second exemplary embodiment, the terminal device 30 detects the first object and the second object from application data in which the layer order of objects is specified, and converts an object in a layer interposed between the layer of the first object and the layer of the second object into a spot color. This saves a user setting complicated spot color printing settings using a driver setting screen, thereby reducing the load of spot color printing settings, as in the first exemplary embodiment.

The first and second exemplary embodiments have been discussed in the form of an information processing apparatus, that is, the image forming apparatus 10 and the terminal device 30 as examples. An exemplary embodiment of the disclosure may be in the form of a program for causing a computer to execute the individual functions of the information processing apparatus. An exemplary embodiment of the disclosure may be in the form of a non-transitory computer readable storage medium storing this program.

The configurations of the information processing apparatuses discussed in the first and second exemplary embodiments are only examples. Various modifications may be made without departing from the spirit and scope of the disclosure.

The processing operations of the programs described in the flowcharts are also only examples. Steps may be added, deleted, changed, or replaced without departing from the spirit and scope of the disclosure.

In the first and second exemplary embodiments, the processing operations are implemented by a software configuration using a computer executing the programs. However, an exemplary embodiment of the disclosure may be implemented by a hardware configuration or a combination of hardware and software configurations.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:
a processor configured to:
detect a first object and a second object from application data, a layer order of objects being specified in the application data, each of the first and second objects being presented in a predetermined display mode; and
convert an object in a layer positioned between a layer of the first object and a layer of the second object into a spot color.

(((2)))

The information processing apparatus according to (((1))), the application data is data which does not support spot colors and which is created by an application that is able to specify the layer order of objects.

(((3)))

The information processing apparatus according to (((1))) or (((2))),
wherein the first object is a start edge indicating a start of a spot color converting range, while the second object is an end edge indicating an end of the spot color converting range; and
wherein the predetermined display mode of the first object is different from the predetermined display mode of the second object.

(((4)))

The information processing apparatus according to (((3))), wherein a type of spot color is associated with the predetermined display mode of the first object.

(((5)))

The information processing apparatus according to one of (((1))) to (((4))), wherein the predetermined display mode of each of the first and second objects is expressed by at least one of a shape, color, and text.

(((6)))

The information processing apparatus according to (((5))), wherein a type of spot color is associated with the at least one of the shape, color, and text of the first object.

(((7)))

The information processing apparatus according to one of (((1))) to (((6))), wherein the processor is configured to exclude each of the first and second objects from objects to be subjected to spot color printing.

(((8)))

The information processing apparatus according to one of (((1))) to (((7))), wherein the processor is configured to set the first object in a bottommost layer of the layer order and exclude an object in a layer higher than the layer of the second object.

(((9)))

An information processing system comprising:
an information processing apparatus that performs spot color conversion; and a terminal device connected to the information processing apparatus, a processor of the terminal device configured to:

send application data in which a layer order of objects is specified to the information processing apparatus; and a processor of the information processing apparatus configured to:

detect a first object and a second object from the application data received from the terminal device, each of the first and second objects being presented in a predetermined display mode; and convert an object in a layer positioned between a layer of the first object and a layer of the second object into a spot color.

(((10)))

An information processing program causing a computer to execute a process, the process comprising:

detecting a first object and a second object from application data, a layer order of objects being specified in the application data, each of the first and second objects being presented in a predetermined display mode; and converting an object in a layer positioned between a layer of the first object and a layer of the second object into a spot color.

What is claimed is:

1. An information processing apparatus comprising:

a processor configured to:

detect a first object and a second object from application data, a layer order of objects being specified in the application data, each of the first and second objects being presented in a predetermined display mode; and convert an object in a layer positioned between a layer of the first object and a layer of the second object into a spot color, wherein the processor is configured to set the first object in a bottommost layer of the layer order and exclude an object in a layer higher than the layer of the second object.

2. The information processing apparatus according to claim 1, wherein the application data is data which does not support spot colors and which is created by an application that is able to specify the layer order of objects.

3. The information processing apparatus according to claim 1, wherein the first object is a start edge indicating a start of a spot color converting range, while the second object is an end edge indicating an end of the spot color converting range; and wherein the predetermined display mode of the first object is different from the predetermined display mode of the second object.

4. The information processing apparatus according to claim 3, wherein a type of spot color is associated with the predetermined display mode of the first object.

5. The information processing apparatus according to claim 1, wherein the predetermined display mode of each of the first and second objects is expressed by at least one of a shape, color, and text.

6. The information processing apparatus according to claim 5, wherein a type of spot color is associated with the at least one of the shape, color, and text of the first object.

7. The information processing apparatus according to claim 1, wherein the processor is configured to exclude each of the first and second objects from objects to be subjected to spot color printing.

8. An information processing system comprising:

an information processing apparatus that performs spot color conversion; and a terminal device connected to the information processing apparatus, a processor of the terminal device configured to:

send application data in which a layer order of objects is specified to the information processing apparatus; and a processor of the information processing apparatus configured to:

detect a first object and a second object from the application data received from the terminal device, each of the first and second objects being presented in a predetermined display mode; and convert an object in a layer positioned between a layer of the first object and a layer of the second object into a spot color, wherein the processor is configured to set the first object in a bottommost layer of the layer order and exclude an object in a layer higher than the layer of the second object.

9. A non-transitory computer readable medium storing a program causing a computer to execute a process, the process comprising:

detecting a first object and a second object from application data, a layer order of objects being specified in the application data, each of the first and second objects being presented in a predetermined display mode; and converting an object in a layer positioned between a layer of the first object and a layer of the second object into a spot color, wherein the first object is set in a bottommost layer of the layer order, and an object in a layer higher than the layer of the second object is excluded.

10. The information processing apparatus according to claim 1, wherein a spot color type is associated with the predetermined display mode of the first object, and the object in the layer positioned between the layer of the first object and the layer of the second object is converted into the spot color based on the spot color type associated with the predetermined display mode of the first object.

11. The information processing system to claim 8, wherein a spot color type is associated with the predetermined display mode of the first object, and the object in the layer positioned between the layer of the first object and the layer of the second object is converted into the spot color based on the spot color type associated with the predetermined display mode of the first object.

12. The non-transitory computer readable medium according to claim 9, wherein a spot color type is associated with the predetermined display mode of the first object, and the object in the layer positioned between the layer of the first object and the layer of the second object is converted into the spot color based on the spot color type associated with the predetermined display mode of the first object.

* * * * *